United States Patent Office 3,503,499
Patented Mar. 31, 1970

3,503,499
FLOTATION PROCESS INCLUDING OZONE TREATMENT
Aldo P. Allegrini, Westfield, and Daniel A. Jacobs and Venancio V. Mercade, Metuchen, N.J., assignors to Engelhard Minerals & Chemicals Corporation, Woodbridge, N.J., a corporation of Delaware
No Drawing. Filed June 27, 1968, Ser. No. 740,456
Int. Cl. B03b 1/00; B03d 1/04
U.S. Cl. 209—5                                    2 Claims

ABSTRACT OF THE DISCLOSURE

Ozone is used as the oxidizing agent in a flotation process in which an ore pulp, such as a pulp of impure gray kaolin clay, is treated with an oxidizing agent and is then beneficiated by flotation in the presence of a reagent that is adversely affected by an oxidizing agent.

This invention deals with ore beneficiation processes in which an aqueous ore pulp is oxidized by addition of a strong oxidizing agent before it is treated with a flotation reagent that is deleteriously affected by oxidation.

BACKGROUND OF THE INVENTION

Certain flotation procedures utilize aliphatically unsaturated fatty acids, especially tall oil acids and oleic acid. The fact that these organic compounds are attacked by strong oxidizing agents forms the basis for certain uses of oxidizing agents in ore flotation processes. Examples of processes in which oxidizing agents are used to destroy a fatty acid collector reagent are the molybdenite recovery process described in U.S. 2,559,104 to Nathaniel Arbiter and the oxide flotation process described in U.S. 3,094,485 to Antoine N. Gaudin et al. In the former process the oxidizing agent attacks a fatty flotation reagent in a flotation concentrate. In the latter case, the oxidizing agent is present during flotation and prevents collection of a mineral such as calcite by a soap. In these cases, the susceptibility of conventional fatty acid flotation reagents to chemical attack by strong oxidizing agents is put to good use.

In contrast to the above-mentioned process, oxidizing agents may also be used in certain flotation beneficiation processes in which residual oxidizing agent has a detrimental effect on one or more flotation reagents. Examples are the procedure for beneficiating gray kaolin clay described in U.S. 3,353,668 to James B. Duke and the process for beneficiating phosphate ore described in U.S. 2,826,301 to Ira M. Le Baron. In these processes, the oxidation treatment is employed to improve the collection of a mineral by a fatty acid collector. Oxidation of the collector would be undesirable and result in increased reagent consumption.

Oxidizing agents may also be used in sparing quantities to prepare certain sulfide ore pulps, especially heavy metal sulfide pulps, for flotation with a xanthate collector. An example is the flotation of arsenopyrite. It is recognized that excess oxidizing agent should be exhausted before the reducing-type collector is added to the sulfide pulp. Reference is made to Taggart's "Handbook of Mineral Dressing," 12–33, 1945, published by John Wiley & Sons, Inc.

Oxidizing agents heretofore suggested for use in treatment of ore pulps are numerous and include potassium permanganate, sodium dichromate, sodium peroxide, sodium hypochloride, chlorine, bromine, combinations of peroxide and sodium fluoride and hydrogen peroxide. All of these oxidizing agents are very soluble in water. Further, they are all relatively stable and are capable of oxidizing material as long as they are dissolved in sufficient concentration in the pulp. Therefore, when the prior art oxidizing agents are used to activate or otherwise precondition a pulp for flotation, the danger exists that residual oxidizing agent may destroy the fatty acid or xanthate collector when it is added to condition the pulp for flotation.

Another characteristic of the prior art oxidizing agents, especially the very strong agents such as potassium permanganate, is that they are most effective in acidic pulps. When fatty acid collectors are employed in alkaline pulps this means that the pulp must be acidified before oxidation and then alkalized, necessitating the use of extra reagents. In the case of clay flotation this is especially undesirable because the salt by-products introduced by the pH adjustment steps have an undesirable effect on the aqueous viscosity of the ultimate clay product. This problem would be avoided by employing an oxidizing treatment with a neutral or alkaline pulp.

Furthermore, when beneficiating clay by flotation, it is desirable to process a fractionated clay from hydraulic classifiers. These slips invariably contain sodium silicate which is employed to fluidize the slip and permit classification to be carried out at an economically feasible solids level. Subsequent flotation beneficiation of the clay to remove colored impurities is also carried out with a dispersed pulp and the sodium silicate dispersant performs the additional function of depressing the clay during flotation. It would be desirable to be able to treat the dispersed fractionated clay slip from the classifiers without affecting the dispersed condition of the slip during the oxidation treatment. However, when employing potassium permanganate or the like, the dispersed fractionated slip is acidified and thus flocculated and must be subsequently redispersed. Aside from the extra quantities of dispersants required, salt by-products are introduced.

Accordingly, an object of this invention is to provide a method for preconditioning an aqueous ore pulp with a strong oxidizing agent in a manner such as to avoid subsequent chemical attack of an oxidizable flotation reagent by residual oxidizing agent.

Another object is to provide an oxidation treatment which is effective in neutral and alkaline pulps.

Still another object is to utilize an oxidizing agent which does not introduce soluble salts into a pulp.

A specific object is to provide improvements in a process for brightening gray (hard) kaolin clay by oxidation treatment followed by froth flotation.

Further advantages and features of the invention will be apparent from the description which follows.

Briefly stated, in accordance with the present invention ozone is employed to oxidize an aqueous ore pulp that is subsequently beneficiated by flotation in the presence of a flotation reagent that is susceptible to oxidation by a strong oxidizing reagent.

In contrast to oxidizing agents of the prior art which are water-soluble and maintain their activity over relatively long periods of time, ozone reacts rapidly and is virtually insoluble in water. Thus, residues of prior art oxidizing agents remain in the pulps and are able to destroy flotation reagents when they are subsequently added. Any ozone that is not consumed in oxidizing the pulp rapidly passes out of the pulp.

The invention is of especial benefit in the processing of discolored gray kaolin clay by flotation of colored impurities to improve the brightness of the clay. Following is a summary of advantages of using ozone to oxidize a dispersed aqueous slip of discolored gray kaolin clay prior to flotation concentration of colored impurities as compared to the prior art use of oxidizing agents such as potassium permanganate and hydrogen peroxide:

(1) Ozone is substantially insoluble in water and unused ozone passes out of the slip. Residual ozone is not present to attack fatty acid collector, as would the other reagents.

(2) The oxidation with ozone in the dispersed alkaline medium is much faster than when potassium permanganate or hydrogen peroxide is used.

(3) The dispersed state or condition of the clap slip is not affected by the oxidation treatment as it would be with potassium permanganate.

DESCRIPTION

The invention is generally applicable to any process in which constituents in gray impure sedimentary kaolin clay are oxidized before an aqueous pulp of the clay is agitated with an aliphatically unsaturated fatty acid (or soap) reagent which selectively coats titaniferous colored impurities in the clay pulp, the reagent being one which would be rendered ineffective as a result of oxidation. The coated impurities in the reagentized clay pulp are removed as a float product from the dispersed clay in the pulp. An example of such process is the froth flotation process described in U.S. 3,353,668 to James B. Duke.

Flotation treatments encompass froth flotation, dissolved air flotation, agglomeration flotation, etc.

In putting the invention into practice, ozone gas is incorporated in the form of finely divided gas bubbles in an aqueous ore pulp. Various means may be employed to disperse the gas in the aqueous phase. Since ozone is low in solubility and density, it is generally desirable to incorporate the gas near the bottom of the pump by a suitable gas disperser. One suitable method is described in a copending U.S. patent application, Ser. No. 690,423, filed Dec. 14, 1967 by Tom A. Cecil et al.

The quantity of ozone employed varies with the ore being treated and with the efficiency with which the ozone is utilized, especially the efficiency of the gas-solid contact during the oxidation treatment. In most cases ozone is employed in amount with the range of 1 to 20#/ton of ore being treated.

The ore pulps may vary widely in pH, varying from distinctly acidic, e.g., pH of 2.5, to strongly basic, e.g., pH of 11.

Ozone treatment is eminently effective in the presence of sodium silicate and thus may be employed in the treatment of mildly basic slimed ore pulps in which sodium silicate has been employed as a dispersant in the preparation of that pulp for flotation or other treatment.

Ozone oxidizes very rapidly in aqueous media and the oxidation treatment may be almost instantaneous in some cases. In most instances it will suffice to bubble the dispersed gas into the pulp for a time within the range of 5 to 30 minutes. In some cases, longer contact periods, e.g., 2 to 3 hours, may be required. Substantially immediately after oxidizable material in the pulp has been oxidized, any excess ozone rapidly passes out of the pulp and is discharged into the atmosphere.

Ozone or ozone-air mixtures may be employed.

After the gas has been bubbled into the pulp for a time sufficient to accomplish the desired oxidation, the pulp may be directly conditioned for flotation with suitable flotation reagents. As mentioned, the gas is rapidly exhausted from the pulp and the oxidized pulp no longer contains material which will decompose flotation reagents. The selection of suitable flotation reagents depends on the particular ore being treated.

Features of the process of the invention and some of its advantages will be more fully appreciated by the following example which describes the application of the process to the removal of colored impurities and brightening of discolored Georgia gray kaolin to provide a high quality kaolin pigment suitable for use in paper and paints.

The starting clay employed in carrying out the tests to be described was a hard sedimentary kaolin clay obtained from a mine near McIntyre, Ga. The clay, as mined, was unsuitable for use as a quality paper coating pigment because of its low brightness and distinctly gray color-cast. After a slip of the clay was degritted, fractionated and a resulting fine size fraction bleached with zinc hydrosulfite (a conventional clay bleaching reagent), the clay was still unsuitable because of its low brightness and gray color. When yellow-brown titania impurities were selectively floated from a fractionated dispersed slip of the clay with calcite, and an emulsified mixture of ammonia, tall oil acids and oil-soluble petroleum sulfonate before bleaching with zinc hydrosulfite, the product still had a gray color and did not possess the desired 90% G.E. brightness. When the dispersed fractionated slip of the clay was processed, in accordance with the teachings of U.S. 3,353,668 to James B. Duke, by acidifying to a pH of 2.5 with sulfuric acid, treating with potassium permanganate, dispersing, floating the clay with the reagents above-described and then bleaching with zinc hydrosulfite, a bright, white product was obtained. Following the teachings of the prior art, however, it was necessary in processing the dispersed fractionated slip of clay from the classifiers to acidify and flocculate the slip before oxidation treatment with a water-soluble oxidizing agent. After the oxidation treatment it was necessary to realkalize and redisperse the pulp. Consequently, a considerable quantity of salt material was introduced with the clay. Further, using prior art oxidizing agents, e.g., potassium permanganate, sodium hypochloride, sodium peroxide, residual soluble oxidizing agent was left in the pulp and a large quantity of collector was required.

In the examples which follow, clay brightness was measured with a General Electric Recording Spectrophotometer and was reported as the percentage of 457 m$\mu$ light reflected as compared to the light of the same wavelength reflected by a pure magnesium oxide standard.

Example I

This example illustrates the benefits of treating a dispersed aqueous slip of discolored kaolin clay with ozone before floating colored impurities from the clay, in accordance with this invention.

The gray clay was dispersed in water and fractionated as follows prior to flotation (Test A) or ozone treatment and subsequent flotation (Test B).

A 7,282 gm. sample of the gray clay (6000 gm. dry clay) was blunged in 2,720 ml. deionized water by mixing the ingredients for 10 minutes in a Denver conditioning slip. The resulting slip had a pH of 4.1. The slip was dispersed, as described in a copending application, Ser. No. 601,559, filed December 14, 1966, now U.S. Pat No. 3,410,399 by Joseph L. Hunter, by adding 20.0 ml. of a 5% aqueous solution of sodium hydroxide, agitating 15 minutes, adding 240 ml. of a 5% solution of sodium carbonate, agitating 15 minutes, adding a hydrosol obtained by slowly mixing 105 ml. of a 1% alum solution with 240 ml. of 5% solution of "N®" sodium silicate solution, followed by agitation for 15 minutes. The slip was degritted to remove plus 325 mesh matter and the degritted slip was centrifuged to provide a dispersed slip of fractionated clay particles at least 90% by weight of which were finer than 2 microns. This dispersed slip had a pH of 8.2 and contained 20.6% solids. G.E. brightness of the clay in the fractionated slip was 82.5%. Chemical analysis showed that $TiO_2$ and $Fe_2O_3$ were 1.85% and 0.93% by weight, respectively.

Test A.—Flotation beneficiation without preliminary ozone treatment-control.—Five hundred grams of the 20.6% solids dispersed fractionated slip was conditioned for flotation to remove colored titania impurity by adding the following reagents in the order listed: Calcite having an average size of about 2 microns, 150 gm.; $(NH_4)_2SO_4$ as a 5% solution, 30 ml.; an emulsion containing 20 ml. 5% $NH_4OH$ solution, 82 drops tall oil acids, 82 drops neutral oil-soluble calcium petroleum sulfonate salt ("Calcium Petronate"); and fuel oil ("Eureka M"), 71 drops.

Total conditioning time was 17 minutes. A float was made for 10 minutes and the froth was refloated three times without addition of reagents, producing a yellow froth containing an intimate mixture of calcite and colored titaniferous clay impurity. The machine discharge products containing the flotation beneficiated clay were then combined.

To ascertain the effectiveness of the flotation treatment, chemical analyses of a sample of the combined machine discharge products were made along with an analysis of the fractionated clay before flotation. The G.E. brightness was obtained. Results are summarized in Table I.

Test B.—Ozone treatment plus flotation.—In accordance with this invention, a sample of the 82.5% brightness fractionated clay was beneficiated and brightened as follows.

A 500 gm. sample of the dispersed fractionated alkaline 20.6% solids slip was oxidized with ozone gas by the procedure described in the above-mentioned application to Cecil et al. The slip was placed in an Airflow flotation cell and, while the impeller was in operation, ozone gas was admitted under pressure below the impeller for 2¼ hours at a rate of 1 liter/minute. The concentration of ozone in the gas was 31 milligram/liter and the total amount of ozone admitted was calculated to be 4.18 grams, corresponding to 10 lbs. ozone per ton of clay in the slip. Ozone treatment did not affect the dispersion of the clay slip and no evidence of flocculation was apparent.

The ozone treated slip, without any further treatment, was then conditioned for flotation with the same reagents used in Test A. In order to demonstrate that the ozone did not impair the flotation collector and necessitate additional quantities of reagents, the same quantities of reagents used in Test A were employed. Following conditioning, the slip was subjected to froth flotation using the identical procedure employed in Test A. The flotation machine discharge product was flocced, filtered and dried, producing a white, bright clay product. Chemical analyses were obtained and brightness measured as in Test A. Results are summarized in Table I.

TABLE I.—EFFECT OF USING OZONE ON THE FLOTATION OF COLORED IMPURITIES IN GEORGIA HARD KAOLIN CLAY

| | Unbleached beneficiated clay product | | | |
|---|---|---|---|---|
| | | Colored impurities | | |
| Ozone pretreatment | G.E. brightness | $TiO_2$, wt. percent | $Fe_2O_3$, wt. percent | Clay recovery, wt. percent |
| Test A, none | 86.8 | 0.42 | 0.77 | 91.2 |
| Test B: | | | | |
| Ozone used | 90.6 | 0.31 | 0.76 | 92.0 |
| Starting clay | 82.5 | 1.85 | 0.93 | |

The chemical analyses of the floated products which appear in the table show that the beneficiated clay contained 0.42% $TiO_2$ when it was floated without ozone treatment and 0.31% $TiO_2$ when ozone treatment was carried out before flotation. Therefore, 25% more $TiO_2$ was removed by flotation when the clay slip was oxidized with ozone before the flotation treatment.

Brightness data in the table show that without ozone treatment, the beneficiated clay had a brightness of 86.8%, appreciably below the desired 90% brightness. Thus, a chemical bleach treatment was needed to bring this floated clay to the 90% brightness level. In contrast, when ozone was used before flotation, the beneficiated clay had a brightness of 90.6%, well above the minimum desired.

Thus, a dispersed alkaline slip from a conventional clay classification step was oxidized with ozone before flotation without impairing the dispersion of the slip and without adding chemicals that would contribute to the presence of salts in the clay product. The use of ozone in this manner resulted in a 25% increase in the amount of titania removed during subsequent flotation and a 90% brightness product was obtained without a hydrosulfite bleaching treatment. The ozone treatment did not affect the flotation collectors and thus no additional quantity of collector was required.

Example II

Tests were carried out to determine the effect of the ozone pretreatment on the bleachability of flotation beneficiated kaolin and to determine the extent to which clays floated with and without ozone treatment could be further brightened by chemical means.

In bleaching the sample of gray kaolin floated without an ozone treatment, recognition was given to the fact that gray kaolin clay, including flotation beneficiated gray clay, does not respond well to a conventional reducing bleach. (See U.S. 3,353,668 to James B. Duke.) Therefore, to bleach the floated gray clay that had not been treated with ozone before flotation, samples were treated with various proportions of a dilute potassium permanganate solution at a pH of 3.5 for 48 hours and then with a zinc hydrosulfite solution at a pH of 3.5, as described in U.S. 3,353,668. Some samples of flotation beneficiated clay from Test B were samples of flotation beneficiated clay zinc hydrosulfite (without using an oxidizing agent before the hydrosulfite bleaching as in Test A). Other samples were bleached with various combinations of potassium permanganate and then with zinc hydrosulfite, as in Test B.

Results of the bleach treatment are summarized in Table II.

TABLE II.—EFFECT OF CHEMICAL BLEACHES ON FLOATED GRAY KAOLINS

| | Brightness of floated, bleached kaolins | |
|---|---|---|
| Bleach | Ozone pretreatment, brightness, percent | No ozone pretreatment, brightness, percent |
| None | 90.6 | 86.5 |
| Zn hydrosulfite, 9 #/ton | 92.0 | |
| $KMnO_4$, 5 #/ton +Zn hydrosulfite, 15 #/ton | 92.7 | 91.8 |
| $KMnO_4$, 15 #/ton+Zn hydrosulfite, 24 #/ton | | 92.4 |
| Ozone treatment, no flotation | 86.5 | |
| Starting clay | 82.5 | |

Data in Table II for the effect of ozone pretreatment on the bleachability of the floated gray kaolin show that the floated clay was brightened to 92% by 9 #/ton zinc hydrosulfite without additional oxidation treatment. When ozone treatment was not used before flotation, the use of 5 #/ton potassium permanganate followed by 15 #/ton zinc hydrosulfite did not bring the floated clay to such a brightness level.

We claim:

1. A process for brightening and purifying gray kaolin clay containing a titaniferous impurity which comprises providing an aqueous alkaline sodium silicate dispersed pulp of said clay, incorporating ozone gas into said dispersed pulp until oxidation takes place, thereafter conditioning said pulp with tall oil acid collector reagent and subjecting the conditioned pulp to flotation, thereby forming a float product which is a concentrate of said titaniferous impurity and a dispersed pulp of purified, brightened clay, the ozone gas dissolving out of the dispersed pulp before conditioning with said collector reagent and, therefore, not being present to oxidize said tall oil acid.

2. A process for brightening and purifying gray kaolin clay containing a titaniferous impurity which comprises providing an aqueous alkaline sodium silicate dispersed pulp of said clay, incorporating ozone gas into said dispersed pulp until oxidation takes place, thereafter conditioning said pulp with a collector reagent for said titaniferous impurity, said collector reagent including an oxidizable aliphatically unsaturated fatty acid, and subjecting the conditioned pulp to flotation, thereby forming a float product which is a concentrate of said titaniferous impurity and a dispersed pulp of purified, brightened clay, the ozone gas dissolving out of the dispersed pulp before conditioning with said collector reagent and, therefore, not being present to oxidize said fatty acid collector.

References Cited

UNITED STATES PATENTS

| | | | |
|---|---|---|---|
| 1,555,915 | 10/1925 | Ellis | 209—166 |
| 1,690,225 | 11/1928 | Hahn | 209—166 |
| 1,986,817 | 1/1935 | Nusselstrom | 209—166 X |
| 2,055,808 | 9/1936 | Wait | 210—63 |
| 2,660,559 | 11/1953 | Prime | 210—63 |
| 3,236,766 | 2/1966 | Levin | 210—44 X |
| 3,302,785 | 2/1967 | Greene | 209—166 X |

HARRY B. THORNTON, Primary Examiner

ROBERT HALPER, Assistant Examiner

U.S. Cl. X.R.

23—110; 106—288; 209—166

UNITED STATES PATENT OFFICE
CERTIFICATE OF CORRECTION

Patent No. 3,503,499                                                           March 31, 1970

Aldo P. Allegrini et al.

It is certified that error appears in the above identified patent and that said Letters Patent are hereby corrected as shown below:

Column 4, line 46, "was blunged in 2,720 ml. deionized water by mixing" should read -- was blunged in 12,720 ml. deionized water by mixing --. Column 6, lines 20 and 21, "Some samples of flotation beneficiated clay from Test B were samples of flotation beneficiated clay" should read -- Some samples of flotation beneficiated clay from Test B were bleached with various quantities of --.

Signed and sealed this 29th day of December 1970.

(SEAL)
Attest:

Edward M. Fletcher, Jr.                           WILLIAM E. SCHUYLER, JR.
Attesting Officer                                         Commissioner of Patents